United States Patent Office 3,705,108
Patented Dec. 5, 1972

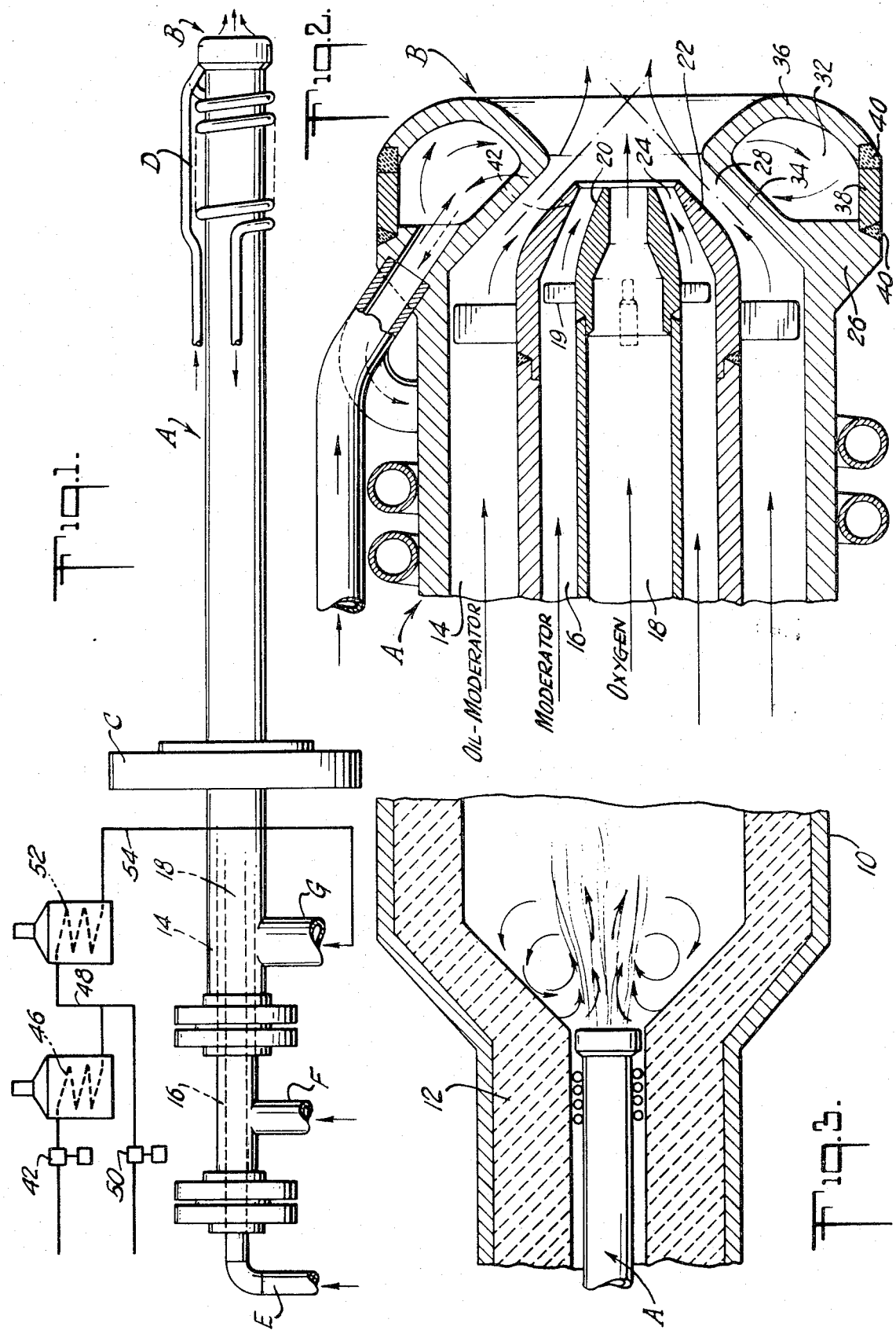

3,705,108
SYNTHESIS GAS GENERATION
Charles P. Marion, Mamaroneck, N.Y., and Blake Reynolds, Riverside, Conn., assignors to Texaco Development Corporation, New York, N.Y.
Filed Oct. 6, 1969, Ser. No. 863,784
Int. Cl. C07c 1/02
U.S. Cl. 252—373
5 Claims

ABSTRACT OF THE DISCLOSURE

Synthesis gas is generated by reacting a finely divided preatomized liquid oil suspended in steam or other moderator, with high purity molecular oxygen. The problem of burner deterioration is overcome by using a triple orifice burner in which the oxygen is conveyed thru a central orifice, the preatomized oil/steam phase is passed thru an outer annular orifice coaxially about the oxygen orifice and separated therefrom by a third stream of steam or other moderator which forms an annular sheath separating the oxygen and oil streams for a finite distance downstream of the nozzle tip which thus spaces the tip a finite distance from the point where combustion occurs.

---

The present invention relates to the generation of a mixture of hydrogen and carbon monoxide, referred to as synthesis gas, by partial oxidation of a liquid hydrocarbon with molecular oxygen in the presence of a moderator such as shown at an elevated temperature and pressure.

BACKGROUND OF THE INVENTION

The general background of this process, as it has been practised for some time, is outlined in co-pending application Ser. No. 787,885, filed Dec. 30, 1968, to which reference is made for the information and details presented therein.

In general the aforesaid process is conducted typically at temperatures between, for example, 1800 and 3500° F., and at elevated pressures under self-supporting conditions by the introduction of the reactants thru an orifice burner or nozzle into a reaction zone. It is desirable therefore to so carry out the introduction and supply of the reactants that the burner or nozzle is able to withstand the thermal, erosive and chemical effects of the high temperature reactants.

Obviously deterioration of the burner is a seriously limiting factor in the operation of such a process of manufacture because failure not only requires shut-down but can result in serious difficulty. It is therefore important to minimize, insofar as possible, the effect of the intense heat of the reaction zone to which the extremity of the burner or nozzle is subjected as well as the effect of the turbulent circulation of combustion gases which tend to sweep the exposed nozzle surfaces at high pressure and to subject them to conditions of erosive and chemical attack.

Obviously the prime reactants, namely liquid oil and molecular oxygen, particularly high purity molecular oxygen, burn almost immediately with intense heat liberation. It must be recognized however that the products of reaction, namely hydrogen and CO also react exothermally with molecular oxygen. Inasmuch as the latter products occupy the reaction chamber in the region of the nozzle and about the incoming stream of reactants, additional reaction tends to go on in this region between pure molecular oxygen and the hydrogen, and carbon monoxide, for example. While later on in the reaction zone a condition of equilibrium is reached where the products are essentially hydrogen and CO, nevertheless it must always be recognized that complete highly exothermal combustion may tend to take place at and about the nozzle and therefore is usually the source of the burner deterioration which the present invention seeks to overcome.

On the other hand the reactants such as steam and $CO_2$, while they may enter into the overall reaction, do not combine with any of the constituents of either the feed or the reaction zone in such a manner as to liberate any appreciable heat energy. Steam, for example, typically moderates the intense heat of the reaction which would occur if high purity molecular oxygen and oil were the only reactants, this being so even though controlled partial combustion ensues, namely to a final product of hydrogen and carbon monoxide instead of water vapor and carbon dioxide, even though complete combustion may have occurred locally.

Moreover locally formed products of complete combustion, such as steam and carbon monoxide thereafter react endothermally with unburned oil in reaching final equilibrium.

Among other typical reactions which go on in the reaction zone, that between steam and carbon monoxide, which is known as the water gas shift reaction, releases only insignificant or trivial heat energy. The reverse of this reaction by which carbon dioxide reacts with hydrogen to form water vapor and carbon monoxide is therefore endothermal. Hence both carbon dioxide and water vapor are not only present during the course of reaction but when added as reactants, moderate the overall exothermal effect and at the same time contribute to the oxygen requirement of the final combustion product. Also, as is known, carbon dioxide, in addition to its moderating effect, may be desirably substituted for water vapor where it is desirable to obtain a synthesis gas having a relatively greater proportion of CO than would be the case if steam alone was used. Obviously therefore mixtures of these materials may also be used, as for example, flue gas.

PRESENT INVENTION

The present invention has to do with the introduction of the liquid hydrocarbon fuel into the reaction zone thru the burner inlet in the form of, for example, a fog or dispersion of droplets of the oil in a stream of the moderator.

This method of supplying the liquid oil and the general benefits thereof are described and claimed more specifically in U.S. Pat. No. 2,809,104, to which reference is made for the details and technique of such operation. More specifically, this method of feeding the hydrocarbon fuel into the reaction zone may be accomplished by mixing particles of hydrocarbon oil into the moderator stream at a point sufficiently up-stream from the burner tip to result in efficient and complete atomization before the mixture reaches the burner tip, as disclosed in the said aforesaid patent. One method of achieving this result is to pass the liquid hydrocarbon oil and steam, for example, thru an elongated tubular zone at a high temperature and pressure, and at a velocity sufficient to produce intense turbulence in the stream.

The present invention is thus to be distinguished from the partial combustion process for the production of synthesis gas which is conducted by means of a so-called tip-atomizing burner, as in the aforesaid application Ser. No. 787,885, wherein a stream of liquid oil projected into the reaction zone is atomized literally by the shredding action of a turbulent jet of oxygen or other gas in the reaction zone per se.

The present invention is distinguished from the foregoing by the introduction of the reactants into the reaction chamber by means of three separate, preferably, although not necessarily, convergent, concentric nozzles or orifices, in such a manner and in such relationship as to obviate the determiental effects previously referred to. This is accomplished by separating the highly exothermally reactive liquid hydrocarbon and molecular oxygen streams respectively emerging from the nozzle, by an intermediate sheath of moderator which separates the reactants for a distance sufficiently downstream from the nozzle tip to protect it from overheating.

The three reactants involved are first, a liquid hydrocarbon oil which is the primary fuel of the combustion reaction, preatomized in a stream of steam or other moderator; and second, molecular oxygen, preferably of relatively high purity, for effecting the combustion exothermally and maintaining an overall exothermal reaction which is, hence, self-sustaining. The third reactant comprises specifically steam, but more generally, steam as a salient example of the class of moderators.

"Moderators" as used herein, means a gaseous or gasiform material which is either essentially inert to the various products, intermediates and feedstocks of the synthesis gas reaction, or, if it enters either directly or indirectly into the formation of the synthesis gas components, namely hydrogen and carbon monoxide, liberates not more than relatively insignificant heat energy as compared with the exothermal effect of the combustion of liquid hydrocarbon, hydrogen or carbon monoxide with molecular oxygen.

One objective of the moderator, as above indicated, is therefore to limit or "moderate" the excessive temperatures which could otherwise prevail particularly at localized points in the reaction zone if the reactants were simply a liquid hydrocarbon oil and a high purity stream of molecular oxygen. Accordingly nitrogen or any other available inert gases may also be used. Therefore, the modertaor is a gasiform material of the class consisting essentially of steam, carbon dioxide and inert gases, such as nitrogen, including other gas compositions or mixtures largely consisting essentially of these constituents, such as flue gas.

The term "consisting essentially of" means, in turn, gases and gasiform mixtures of the foregoing character which may contain typical impurities or foreign gases insofar as much latter gases do not impair appreciably the desirable temperature moderating effect of the "moderator."

Also, while U.S. Pat. No. 2,809,104 describes the preparation of the mist or dispersion of highly atomized liquid oil particles in a stream of steam, the present invention, as previously intimated, contemplates substitution of the steam, in whole or in part by other moderators which may obviously be prepared by similar or equivalent means. Furthermore, reference to "steam," "water vapor" and the "gasiform" condition thereof, is intended to include particles of moisture such as are found in low grade steam, for example.

Accordingly the atomization of oil in the steam by introducing the liquid oil into a highly turbulent flow of steam is preferably effected in an upstream tubular zone at velocities, creating violent turbulence. The oil may also be atomized in, for example, carbon dioxide or in carbon dioxide admixed with steam or in other mixtures of moderators or at the individual streams of the other moderators per se.

One of the difficulties associated with the introduction of the liquid hydrocarbon minutely atomized in the moderating gas, as previously practised, is the aforementioned rapid and almost immediate reaction with molecular oxygen promptly upon contact between these two streams, with resulting severity of the thermal effect in close proximity to the surface of the burner.

The present invention seeks to obviate these detrimental effects by spacing severe thermal reactions from the burner surfaces both as to time and distance. This is done by introducing the feed gases thru a burner composed of three coaxial concentric nozzles.

In accordance with the present invention, the stream of molecular oxygen is introduced into the reaction zone thru the central orifice of the burner or nozzle.

The suspension or mist of oil in steam or in some other moderator is simultaneously introduced thru the outer annular orifice or nozzle. This, as hereinafter appears, comprises only a part of the total moderator supplied to the reaction zone.

The remainder of the moderator is supplied and introduced as a separate stream thru the intermediate annular orifice to act as a separating barrier between the other two highly reactant streams. This barrier persists as a gasiform sheath for a finite distance downstream of the nozzle tip. As a result the severe exothermal reactions with oxygen, whether of the feedstock, product gases or intermediates, are all prevented for a substantial distance from the burner tip. This spacing of the reactants from the tip is sufficient to protect it from rapid and violent reaction.

In order to illustrate the present invention by way of specific example, reference is made to the attached drawing wherein:

FIG. 1 is a general elevation of the burner assembly showing diagrammatically the liquid hydrocarbon fuel preparation.

FIG. 2 is a detailed cross-section taken along the axis of the burner tip.

FIG. 3 is a diagrammatic representation of a burner in position within the reaction chamber, exemplifying, in general, the flow of reactants from the burner tip.

In accordance therewith burner A with tip or nozzle B extends thru an elongated passageway into the reaction chamber of a synthesis gas generator, which is indicated fragmentarily by outer shell 10 and refractory lining 12. As shown, the axial extremity or tip B of the burner faces the heated interior of the reaction chamber. A mounting flange C is provided to attach the burner to the reaction vessel, and cooling tubes D are used to conduct a continuous flow of coolant thru the burner tip, as will hereinafter be more fully described. The remainder of the burner provides for introducing several reactants as follows:

Inlet G conducts a stream of atomized liquid oil, as a uniform fog or mist, in a gasiform moderator to the outer annular channel 14 leading to the outer orifice.

Inlet F conducts an additional stream of gasiform moderator thru an intermediate channel 16 to the intermediate annular orifice. Molecular oxygen is introduced at inlet E into central conduit 18 to central nozzle or orifice 20.

Central nozzle 20 is welded to conduit 18 as shown and is spaced by fins 19 from intermediate tip 22 which, together with the outer surface of the aforementioned 20, defines an intermediate annular nozzle or channel 24 which, as indicated, is fed with a stream of essentially uncontaminated moderator gas. The outer tip or nozzle portion 26 forming a continuation of conduit 14 provides outer, annular nozzle 28 for injecting the liquid oil finely atomized in, for example, a carrier stream of moderator gas.

As a result of this arrangement, therefore, the relatively violently reactive constituents, namely the molecular oxygen and liquid hydrocarbon fuel, are separated from each other at the nozzle tip by a sheath of moderator from channel 24. This is of particular importance inasmuch as the separated constituents react with an intense exothermal liberation of heat which translates into particularly elevated local temperatures when high purity or concentrated molecular oxygen is employed, and even more so where the fuel or liquid oil reaches the burner tip in the form of highly reactive atomized particles, which react almost instantaneously on contact with the oxygen.

Thus spontaneous occurrence of such a reaction in contact with the exposed tip of the burner is avoided by the intervening sheath of moderator issuing from the intermediate annular orifice 24, which separates the major exothermic reactants for a small but finite and important time interval as well as distance, downstream of the nozzle tip. Beyond this the reactants intermingle and are consumed by combustion.

While the exact time interval or distance is not readily measurable, nevertheless the separation of the two major reactant streams at the tip by the intermediate sheath of moderator, in any event, introduces a finite margin of protection at the burner tip.

Also other violent reactants are prevented from engaging in substantial heat-liberating reaction in immediate juxtaposition or contact with the burner.

For example, the outer annular stream which, as indicated in FIG. 3, projects into the atmosphere of reactants within the reaction chamber (carbon monoxide and hydrogen) is not subject to any material exothermal activity. When, as above indicated, the moderator is carbon dioxide, it may react with the surrounding hydrogen but only endothermally. Also, while steam or water vapor, as the moderator, will tend to react exothermally with the surrounding carbon monoxide in the reaction zone, nevertheless, as previously emphasized, the heat release of this reaction, per se, is negligible or insignificant.

The velocities of the streams at the burner tip are generally in the following ranges:

| | Feet per second | |
|---|---|---|
| | Preferred | Broad |
| Oxygen | 200–450 | 100 to sonic. |
| Moderator | 100–450 | 50 to sonic. |
| Oil-moderator | 100–300 | 50 to sonic. |

An essential feature of the present invention is, therefore, the intermediate jet or sheath of moderator forming a uniform and uninterrupted annular separating stream between the two major reactants. This requires an intermediate annular jet substantially uniform in radial section and supplied from a conduit 16 of substantially uniform annular section so that the steam, for example, reaches the orifice as a sheath of essentially uniform density and velocity around the periphery of the central oxygen stream.

Actually, it was found in early experimental efforts that irregularities in the burner, the supply conduit and/or the final orifice resulted in a moderator sheath of irregular and non-uniform character which failed to effect complete separation between the two major reactants. This permitted the reactants to intermingle prematurely at specific discontinuities in the sheath and to react at various unprotected or permeable locations about the periphery of the sheath, where the separation is imperfect.

The outer portions of the burner tip as shown in the drawing are provided with a coolant chamber 32, preferably thin-walled, and defined by an inner face 34 which forms the outer boundary of the annular fuel nozzle. Convex end wall 36 forms the face of the burner on the extremity of the jacket. Finally the chamber is closed on its outer circumferential side by annular wall 38 welded in place as at 40. Cooling tube D, previously mentioned, supplies a flow of coolant to the chamber 32.

Referring now to the preparation of the fuel in the form of a fog of minute particles forming a substantially homogenous and uniform dispersion in the flow of steam or other moderator, attention is addressed to FIG. 1 wherein water is introduced by pump 42 into heating coil 46 where it is converted to steam. The steam thus produced in the heater is discharged into line 48 which is supplied with a stream of liquid oil from a suitable source by pump 50. Pumps 42 and 50 permit accurate proportioning of steam and oil. Intimate dispersion of the oil particles to form a mist or fog in a flow of steam is developed by passage thru a long tubular zone 52 at a relatively high velocity so that the resulting highly turbulent flow thoroughly and evenly disperses the oil droplets in the steam.

In the example illustrated the tubular dispersing zone 52 is a heating coil in which the components are simultaneously subjected to a substantial increase in temperature, preferably however, in the case of heavy oils, within the range of temperature at which the major proportion of the oil remains in liquid form. Turbulent flow is maintained in preheater 52, preferably in excess of 20 feet per second. The resulting heater steam/oil dispersion passes thru line 54 to inlet E of the burner as aforementioned.

It is important to note that the preparation of the oil dispersion is in no way restricted to the method disclosed by U.S. Pat. No. 2,809,104 but can be realized by any other suitable methods of mist formation as, for example, by mechanical preatomizers or by mechanical mixing devices upstream of the burner or in the burner supply conduits.

Flow rates in the supply conduit are best maintained at a sufficient value to support a degree of turbulence which will prevent separation or stratification of the oil particles and, accordingly, maintain the essential uniformity of the dispersed fog-like fluid phase which, in the reaction zone, intimately and immediately mixes with the oxygen stream.

In general, the proportioning of moderator to oil may vary over a wide range. The overall quantity of steam used in the system may vary typically from about 0.2 to 3 lbs. of steam per pound of oil. As indicated, however, the present invention calls for the overall moderator requirement to be split, a portion thereof going into the fog-like atomized dispersion of oil particles and the remainder forming the intermediate annular protecting sheath, which necessarily consists essentially of moderator and is therefore essentially free of fuel.

The division of the moderator between the fuel stream and the intermediate stream which forms the protective sheath may vary widely insofar as the two streams are capable of performing the described functions. The function of the mist or fog stream is to provide a suitable carrier for the atomized particles of oil, whereas the undiluted moderator stream requires a sheath of uniform cross section sufficient to separate physically the major reactants for sufficient time and distance to protect the exposed burner tip surface from the corrosive or erosive effect of the intense reaction heats as described.

Following is an example of a typical operation of the present invention wherein the feed to the synthesis gas reaction chamber is supplied thru a triple orifice burner as shown in the figures of the present drawing.

The central orifice, having a diameter of 1.16″, carries 276 tons per day of oxygen of 98% purity at the rate of 400 feet per second.

The intermediate annular orifice, having an inner diameter of approximately 1.19″, has a radial cross sectional thickness transversely to the direction of flow therein amounting to 0.12″. It carries steam in the amount of 4,483 pounds per hour which issues from the annular tip at the rate of 300 linear feet per second. Thus the central column is surrounded by a sheath of steam approximately 0.12″ in thickness. The next or outer radial nozzle is annularly and coaxially arranged with respect to the other nozzle with an inside diameter of approximately 1.5″ and a thickness of 0.20″. The intermediate and outer annular channels are inclined slightly inwardly with respect to the axis.

The outer nozzle is continuously supplied with an oil/steam mixture comprising uniformly distributed preatomization of 1,538 barrels per day of oil in 4,483 pounds per hour of steam. This mixture leaves the outer annular orifice at the rate of 200 feet per second linear velocity. The fuel oil has the following inspection:

| | |
|---|---|
| Gravity, ° API | 10.0 |
| Gross heating values, B.t.u./lb. | 18,096 |

Ultimate analysis, wt. percent:

| | |
|---|---|
| C | 85.54 |
| H | 10.41 |
| N | 1.00 |
| S | 3.00 |
| O | |
| Ash | 0.05 |
| | 100.00 |

The reaction that takes place in a reaction chamber is maintained at a temperature of approximately 2600° F.

The product is 25,500,000 standard cubic feet per day of synthetic gas having the following analysis:

| | Mol percent |
|---|---|
| CO | 44.72 |
| $H_2$ | 42.02 |
| $CO_2$ | 3.50 |
| $H_2O$ | 8.19 |
| $CH_4$ | 0.22 |
| A | 0.43 |
| $N_2$ | 0.27 |
| $H_2S$ | 0.62 |
| COS | 0.03 |
| | 100.00 |

In the present system the nozzle tip is physically spaced from the point of contact between the oil and the oxygen and therefore from active combustion. The molecular oxygen, as well as the other fuel streams, although they may be, and normally are, preheated, usually have an actual coolant effect on the nozzle because they still are cooler than the severe combustion temperatures downstream of the burner tip. The intermediate annular orifice is essentially immune from attack since it conducts and is swept and protected by the moderating gas which cannot enter into any severe combustion with oxygen or any of the other components of the reaction.

The outer annular orifice is also relatively immune from attack because it is nowhere in contact with reactants which are combustible with each other, except by the water gas shift which, as previously mentioned, is a mildly and insignificantly exothermal reaction.

The contemplated invention is particularly effective, using streams of high purity molecular oxygen in the region of 90–100% purity. It is likewise suitable with ordinary air or oxygen enriched air, that is to say, streams containing more than 21% molecular oxygen. Preheats of the various streams may vary between ambient and 1200 to 1800° F. Also the pressures of reactions are ordinarily conducted above 200 p.s.i., preferably in the range of 400 to 4,000 p.s.i., although pressures as low as atmospheric are equally suitable.

Other embodiments of the present invention will obviously follow from the foregoing disclosure, limited only by the terms of the following claims.

We claim:
1. In the manufacture of synthesis gas by reacting a normally liquid hydrocarbon with a free oxygen containing gas in the presence of a temperature moderating gas in a reaction zone at a temperature in the range of 1800 to 3500° F. and in proportions effective to produce a product gas comprising hydrogen and carbon monoxide by partial oxidation, the improvement which comprises, introducing a stream of free oxygen containing gas, comprising at least 21% by volume oxygen into the reaction zone by way of the central nozzle of a triple orifice burner, simultaneously introducing a stream of temperature moderating gas selected from the group consisting of $H_2O$, $CO_2$, and mixtures thereof through an intermediate coaxial annular nozzle disposed about said central nozzle, and simultaneously introducing a stream of normally liquid hydrocarbon carried as a uniform fog or mist of atomized particles in a carrier stream of said temperature moderating gas through an outer coaxial annular nozzle disposed about said intermediate annular nozzle, wherein said temperature moderating gas issues from said intermediate nozzle as an annular sheath of substantially uniform density and velocity that extends a finite distance downstream of the downstream end of said burner and separates said free oxygen containing gas stream from said stream of hydrocarbon fog a substantial distance downstream from said burner nozzles so as to prevent oxygen from said free oxygen containing gas stream from burning with either said hydrocarbon fog or recirculating synthesis gas in said reaction zone close enough to the tips of said nozzles as to cause their damage.

2. The process as defined in claim 1 wherein said temperature moderating gas is $CO_2$ supplied as flue gas.

3. The process as defined in claim 1 wherein said free oxygen containing gas is selected from the group consisting of air, oxygen enriched air containing more than 21 volume percent $O_2$, and substantially pure oxygen containing $O_2$ in the range of 90–100 volume percent.

4. The process as defined in claim 1 wherein said oxygen containing gas is substantially pure oxygen, said temperature moderating gas is steam, and the overall quantity of steam to hydrocarbon feed is in the range of about 0.2 to 3 pounds of steam per pound of hydrocarbon.

5. The process of claim 1 wherein the velocity of the stream of oxygen containing gas at the nozzle tip is in the range of about 100 feet per second to sonic velocity, the velocity of the stream of hydrocarbon-moderator mist at the nozzle tip is in the range of about 50 feet per second to sonic velocity, and the velocity of the stream of temperature moderating gas at the nozzle tip is in the range of about 50 feet per second to sonic velocity.

References Cited

UNITED STATES PATENTS

| | | | |
|---|---|---|---|
| 3,361,525 | 1/1968 | Derycke et al. | 23—284 |
| 3,528,930 | 9/1970 | Schlinger | 252—373 |

LEON ZITVER, Primary Examiner

A. SIEGEL, Assistant Examiner

U.S. Cl. X.R.
48—215; 23—281